(12) United States Patent
Turatti

(10) Patent No.: US 9,744,479 B2
(45) Date of Patent: Aug. 29, 2017

(54) SYSTEM FOR DEGASSING DEVICE FOR SYSTEMS FOR TREATING FOOD PRODUCTS SUCH AS LEAF VEGETABLES, TUBEROUS, FRUIT OR MEAT, CHEESES OR SAUSAGES, AND LIKE

(71) Applicant: Turatti, S.R.L., Venice (IT)

(72) Inventor: Antonio Turatti, Venice (IT)

(73) Assignee: Turatti, S.R.L., Venice (IT)

( * ) Notice: Subject to any disclaimer, the term of this patent is extended or adjusted under 35 U.S.C. 154(b) by 0 days.

(21) Appl. No.: 14/389,205

(22) PCT Filed: Mar. 28, 2013

(86) PCT No.: PCT/IT2013/000091
§ 371 (c)(1),
(2) Date: Sep. 29, 2014

(87) PCT Pub. No.: WO2013/144989
PCT Pub. Date: Oct. 3, 2013

(65) Prior Publication Data
US 2015/0053088 A1 Feb. 26, 2015

(30) Foreign Application Priority Data
Mar. 30, 2013 (IT) .................................. 12A000127

(51) Int. Cl.
*A47L 5/36* (2006.01)
*B01D 19/00* (2006.01)
(Continued)

(52) U.S. Cl.
CPC ......... *B01D 19/0031* (2013.01); *A23N 12/02* (2013.01); *A23N 15/06* (2013.01);
(Continued)

(58) Field of Classification Search
CPC ............ B01D 19/0042; B01D 19/0036; B01D 45/16; B01D 19/0031; B01D 19/0057
(Continued)

(56) References Cited

U.S. PATENT DOCUMENTS 2,250,116 A 7/1941 Nicholoy
3,476,078 A 11/1969 King, Jr.
(Continued)

FOREIGN PATENT DOCUMENTS

DE 102007037941 A1 2/2009

OTHER PUBLICATIONS

International Search Report and Written Opinion issued in International Patent Application No. PCT/IT2013/000091 dated Mar. 12, 2013.
(Continued)

*Primary Examiner* — Dung H Bui
(74) *Attorney, Agent, or Firm* — Gesmer Updegrove LLP

(57) ABSTRACT

Degassing device for systems for treatment of food products such as leaf vegetables, tuberous, fruit of meet, cheeses or sausages, and like, characterized in that it includes—a degassing conduct for a food product treatment fluid, the degassing conduct having, in sequence along its development trajectory, an inclined inlet tract, within which the flow fluid rises, a degassing tract, and an outlet tract, within which the flow is directed downward; and—a degassing chamber, in correspondence of the degassing tract; the degassing tract having, at least on its upper wall, a plurality of holes suitable to communicate said degassing tract with the degassing tract to permit exit of air bubbles trapped within the flow from said degassing chamber, preventing exit of food products.

9 Claims, 1 Drawing Sheet

(51) Int. Cl.
  *B01D 46/16* (2006.01)
  *A23N 15/06* (2006.01)
  *A23N 12/02* (2006.01)
(52) U.S. Cl.
  CPC ..... *B01D 19/0036* (2013.01); *B01D 19/0042* (2013.01); *B01D 19/0057* (2013.01); *B01D 46/16* (2013.01)
(58) Field of Classification Search
  USPC .... 55/447; 96/155, 188–191, 193, 197, 329, 96/414–416; 95/241, 243, 262
  See application file for complete search history.

(56) References Cited

U.S. PATENT DOCUMENTS

| | | | | |
|---|---|---|---|---|
| 3,918,116 | A * | 11/1975 | Valdespino | A23N 12/02 15/3.13 |
| 4,311,492 | A * | 1/1982 | Eltvedt | 96/416 |
| 4,320,995 | A * | 3/1982 | Tennes | A23N 12/02 406/106 |
| 4,681,601 | A * | 7/1987 | Foster | 73/19.1 |
| 6,767,380 | B2 * | 7/2004 | von Stackelberg, Jr. | 55/431 |
| 7,472,648 | B2 * | 1/2009 | Blanc | A23N 15/02 15/3.11 |
| 2010/0107878 | A1 | 5/2010 | Crowder et al. | |
| 2011/0139378 | A1 * | 6/2011 | Lakatos | C02F 9/00 159/4.01 |
| 2011/0140457 | A1 * | 6/2011 | Lakatos | B01D 1/14 290/1 R |

OTHER PUBLICATIONS

International Preliminary Report on Patentability in International Patent Application No. PCT/IT2013/000091 dated Oct. 1, 2014.

* cited by examiner

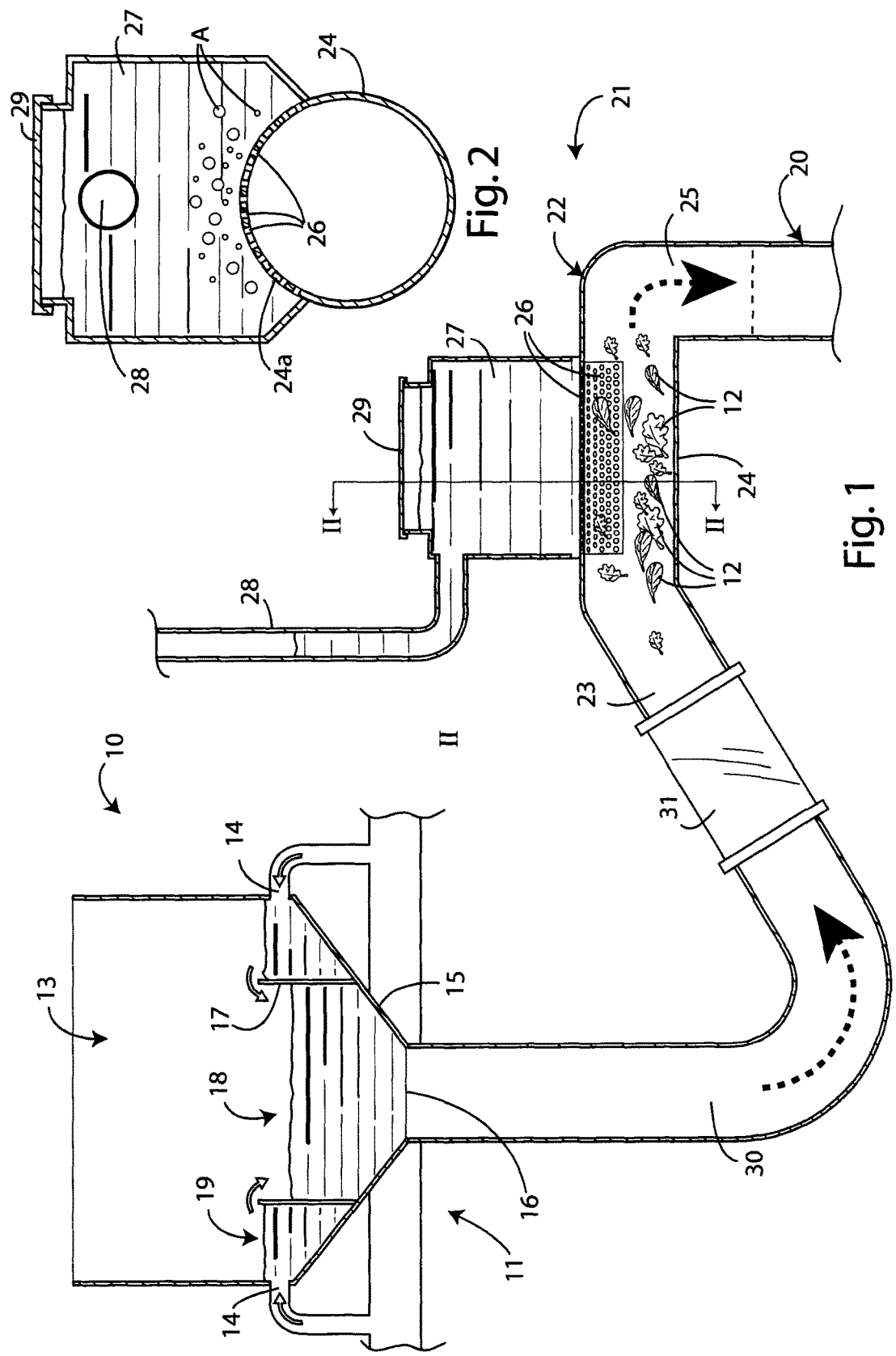

SYSTEM FOR DEGASSING DEVICE FOR SYSTEMS FOR TREATING FOOD PRODUCTS SUCH AS LEAF VEGETABLES, TUBEROUS, FRUIT OR MEAT, CHEESES OR SAUSAGES, AND LIKE

PRIORITY INFORMATION

The present application is a 371 national phase application of International Application No. PCT/IT2013/000091, filed on Mar. 28, 2013, that claims priority to IT Application No. RM2012A000127, filed on Mar. 30, 2012, both of which are incorporated herein by reference in their entireties.

The present invention concerns to a degassing device for systems for treating food products such as leaf vegetables, tuberous, fruit or meat, cheeses or sausages, and like, and system for treatment of said products comprising said device.

Particularly, said degassing device can be usefully employed in systems for washing and/or sanitation food products destined to the food market.

More specifically, said degassing device is particularly suitable to be employed in a system for washing and/or sanitation leaf vegetables to be sold packaged within sealed bags.

Therefore, the present invention is included in the field for production of systems for preparing food products, and in that of accessories for said systems.

Nowadays, systems are known in the field of preparation of food products for washing and sanitation treatments of fragile or delicate products, particularly leaf vegetables. When realizing said systems, it is strongly felt the needing of preventing that food products are damaged during the treatment.

In order to satisfy said needing, traditional systems provide a treatment conduct, within which a fluid flow flows, said flow dragging food product to be subjected to treatment. Said fluid can be particularly water, oil, dye liquid, possibly diluted within water, gelatin, ecc.

Said treatment conduct follows a tortuous path, traditionally comprised of a series of curves, in order to obtain mixing of products along the flow of the same fluid.

Said mixing aims to obtain that fluid, and possible substances dispersed within the same, e.g. sanitation substances, efficiently lick products immersed in the same fluid.

More specifically, said traditional systems provide a loading hopper, in which products to be subjected to treatment and fluid are introduced.

In case said fluid is e.g. water, the same is supplied within the hopper by touching so as to obtain a delicate interaction between water and the same products, in order to prevent damaging of the latter.

Said treatment conduct starts from the bottom of the hopper that, at a first end, is hydraulically connected to the hopper and at the other end is hydraulically connected to a collection tank for products subjected to treatment, or to another treatment section.

Said traditional systems also comprise a withdrawal device suitable to withdraw product subjected to treatment within the collection tank.

Although known systems are efficient when used for washing and sanitation fragile or delicate leaf vegetables, they can be improved.

In fact, known systems have the drawback that fluid and products introduced within the hopper tend to drag also air bubbles.

Said air bubbles travel along treatment conduct with fluid and products, constituting a reason of damaging and oxidation of the same products.

The problem from which the present invention started is that of substantially preventing presence of air bubbles within treatment conducts, otherwise occurring in known systems.

Main object of the present invention is that of realizing a degassing device for systems for treating food products such as leaf vegetables, tuberous, fruit or meat, cheeses or sausages, and like, solving said problem, substantially permitting of preventing presence of air within treatment conducts of the above systems.

Bearing in mind the above goal, it is object of the present invention that of suggesting a degassing device permitting ejecting air dragged from the flow of treatment fluid of systems for treating vegetables products.

Another object of the present invention is that of realizing a degassing system that is structurally simple and that can be easily installed.

Further, it is an object of the present invention that of suggesting a system for treating vegetable products and like permitting obtaining a treatment of vegetable products more delicate with respect to that can be obtained with known systems.

With the above in mind, it is an object of the present invention that of finding a system for treatment of vegetable products permitting preventing damaging of said vegetable products due to presence of air within treatment conducts.

The above result, as well as other objects that will be evident in the following are obtained by a degassing device for treating vegetables products and like, and by a system for treatment of vegetables products and like according to the independent claims.

Detailed features of said degassing device and of the above system according to the invention are described in the dependent claims.

Further features and advantages of the solution according to the invention will be better understood from the description of a preferred, but not exclusive, embodiment of degassing device and of the system for treatment of vegetable products according to the invention, for illustrative, shown but not limitative purposes, in the enclosed drawings, wherein:

FIG. 1 schematically shows a particular of an inlet section of a system for treatment of vegetable products provided with a degassing device according to the invention, and FIG. 2 is a section view taken along line II-II of degassing device of FIG. 1.

Making reference to the figures, it is generically indicated by reference number 10 a system for treatment of vegetable products and like, particularly for washing and/or sanitation vegetable products for food market.

Said system 10 is particularly aimed to washing and/or sanitation of leaf vegetables to be sold within sealed bags.

Said system 10 is provided with means 11 for supplying vegetable products 12 comprising a hopper 13, having, in correspondence of its perimeter, at least an inlet 14 for introduction of water within the hopper 13.

Advantageously, hopper 13 has a substantially conically-shaped bottom 15, at the center of which it is provided a discharge opening 16.

Hopper 13 also has an inner annular neck 17, surrounding opening 16 and defining a central tank 18 within hopper 13, communicating with opening 16, and an annular tank 19 communicating with inlet 14.

Operatively, water introduced within hopper 13 fills annular tank 19 out flowing beyond annular neck 17 within central tank 18, from which exits through opening 16.

Vegetable products 12 are advantageously applied from above within central tank 18, from which they are dragged by water flow through opening 16.

System 10 further comprised at least a treatment conduct 20 and a device for withdrawing vegetable products, said device being a traditional device and thus is not shown in the enclosed drawings.

Vegetable products 12 within the treatment conduct 20 are washed by water flow dragging the same, advantageously within a turbulent regime.

Preferably, at least a treatment product, particularly a sanitation product, is introduced within water flow.

Said system 10 according to the invention, has a specific feature in that it comprises at least a degassing device 21, advantageously provided downward supply means 11 and upward treatment conduct 20.

In other embodiments of the present invention, degassing device 21 could be provided along the treatment conduct 20.

According to the present invention, degassing device 21 for systems for treatment of vegetable products 12 and like, comprises a degassing conduct 22, suitable to remove air bubbles from water flow passing through the same, preferably hydraulically connected with treatment conduct 20 and hopper 13 opening 16, to receive water flow containing vegetable products from the latter.

Degassing conduct 22 has, in sequence along its development trajectory:

an inclined inlet tract 23, within which said flow fluid rises;

a degassing tract 24; and an outlet tract 25, within which said flow is directed downward.

Advantageously, a treatment product is added to said water flow, preferably a sanitation product for vegetable products 12.

Degassing device 21 according to the invention further comprises a degassing chamber 27, in correspondence of the degassing tract 24. The latter has, at least on part of its upper wall 24b, a plurality of holes 26, suitable to communicate degassing tract 24 with degassing chamber 27 to permit exit toward degassing chamber 27 of air bubbles trapped within water flow, thus preventing outlet of vegetable products 12.

Operatively. Water flow arriving from hopper 13, in which air bubbles could be present (said bubbles being indicated by reference A in FIG. 2), rises through inlet tract 23, licking degassing tract 24, descending again through outlet tract 25 toward treatment conduct 20.

Ai bubbles A tend to cluster in the highest point of degassing device 21, i.e. in correspondence of the upper wall 24a of degassing tract 24, from which, through holes 26, they exit entering into the degassing chamber 27.

Advantageously, holes 26 have such an opening permitting passage of air bubbles A, but preventing passage of vegetable products 12.

For example, holes 26 can have a circular shape.

Advantageously, degassing tract 24 has a grid, at least on part of its surface, to permit passage of water and air, but not of vegetable products, toward degassing chamber 27.

Furthermore, degassing chamber 27 is preferably fixed to the degassing tract 24 and it is provided with a reservoir 28, for balancing water pressure within degassing chamber 27, extending substantially vertically.

Advantageously, said reservoir 28 is comprised of a tube vertically rising from degassing chamber 28 until passing at least the water free surface height of hopper 13, to prevent out flowing from the same reservoir 28.

Further, degassing chamber 27 preferably presents above an inspection door 29 permitting inspecting upper wall 24a of degassing tract 24, facing to the degassing chamber 27.

System 10 preferably provides a plurality of treatment conducts 20, provided in series to obtain treatment of vegetable products 12 in following stages.

Further, system 10 advantageously is provided with a collection tank, which is a traditional element and that therefore is not shown in the figures, provided downward the treatment conduct 20.

Hopper 13 is preferably hydraulically connected to degassing device 21 by a connection conduct 30, communicating with opening 16 of hopper 13 and with inlet tract 23 of degassing device 21.

Operatively, water flow along with vegetable products 12, and eventually a treatment product, through connection conduct 30 descends from hopper 13, thus rising again entering within the inlet tract 23 of degassing device 21.

According to the embodiment shown in the enclosed figures, exit tract 25 of degassing device 21 is advantageously hydraulically connected with treatment conduct 20, or it is integral with the latter.

Advantageously, system 10 further comprises an inspection tract 31, by which flowing of water along with vegetables 12 within the same system can be inspected. Inspection tract 31 preferably communicates with degassing conduct 22 and advantageously upward the latter.

The above solution can be realized by introducing many modifications and changes, all included within the scope of the enclosed claims.

For example, holes and/or grid described in the above can be replaced by a plurality of slots or by a single opening covered by a net or narrow and long and eventually S shaped along the degassing tract.

Furthermore, said flow can be comprised of liquids different from water on the basis of the specific use of the system, without departing from the inventive solution as claimed, e.g. said fluid can be oil, coloring substance diluted within water, gelatin and like.

All described details can be replaced by technically equivalent elements.

Treatment conduct 20, as well as degassing conduct 22, are advantageously comprised of metallic material, such as iron, stainless steel or aluminum, bronze, or of plastic material or of composite material, such as carbon fiber; in any case, materials, as well as shapes and dimension, can be modified according to the specific needing and the state of the art.

In case constructive and technical features indicated in the following claims are individuated by signs or numerical references, said signs or numerical references have been added just to better understand the same claims, and consequently they do not limit the interpretation of each element, which is identified just for exemplificative purposes by said signs or numerical references.

The invention claimed is:

1. A system for treatment of food products that includes leaf vegetables, tuberous, fruit or meat, cheeses or sausages comprises a supply means, including a hopper, having, in correspondence of its perimeter, at least an inlet for introduction of water within said hopper;

a degassing conduct for a food product treatment fluid, said degassing conduct being in communication with said hopper by a connecting duct and having, in sequence along a development trajectory, an inclined inlet tract, within which a flow fluid rises, a degassing tract, and an outlet tract, within which said flow fluid is directed downward; and a degassing chamber, in correspondence of said degassing tract; said degassing tract having, at least on a upper wall, a plurality of holes suitable to communicate said degassing tract with said degassing tract to permit exit of bubbles trapped within said flow from said degassing chamber, preventing exit of food products, wherein said hopper has a substantially conically-shaped bottom, at the center of which it is provided a discharge opening, said hopper also has an inner annular neck, surrounding opening and defining a central tank within said hopper, communicating with a surrounding opening, and an annular tank communicating with said inlet.

2. The system according to claim 1, wherein said fluid flow includes a treatment product for said food product.

3. The system according to claim 1, wherein said degassing tract has a grid for permitting passage toward degassing chamber of fluid and air, but not the passage of said food products.

4. The system according to claim 1, wherein said degassing chamber as an upper inspection door.

5. The system according to claim 1, wherein said system includes a plurality of treatment conducts provided in series each other.

6. The system according to claim 1, wherein the system provides a collection basin downward said at least a treatment conduct.

7. The system according to claim 1, wherein the system includes an inspection conduct by which inspecting outflow of fluid flow along food products in the same system.

8. The system according to claim 7, wherein the inspection conduct communicates with said degassing conduct.

9. The system according to claim 1, wherein the degassing chamber is fixed to said degassing tract and said degassing chamber is provided with a reservoir for balancing fluid pressure within said degassing chamber, said reservoir is comprised of a tube vertically rising from said degassing chamber until passing a least water free surface height of the hopper to prevent outflowing from the reservoir, and wherein the tube includes an interior that is at ambient pressure.

* * * * *

UNITED STATES PATENT AND TRADEMARK OFFICE
CERTIFICATE OF CORRECTION

PATENT NO. : 9,744,479 B2
APPLICATION NO. : 14/389205
DATED : August 29, 2017
INVENTOR(S) : Antonia Turatti Page 1 of 1

It is certified that error appears in the above-identified patent and that said Letters Patent is hereby corrected as shown below:

On the Title Page

Please correct the text as indicated below:

(54) Title: SYSTEMS FOR DEGASSING DEVICE FOR SYSTEMS FOR TREATING FOOD PRODUCTS SUCH AS LEAF VEGETABLES, TUBEROUS, FRUIT OR MEAT, CHEESES OR SAUSAGES, AND LIKE

(30) Foreign Application Priority Data: Mar. 30, 2012 (IT) .....................12A000127

(57) Abstract:
Degassing device for systems for treatment of food products such as leaf vegetables, tuberous, fruit or meat, cheeses or sausages, and like, characterized in that it includes – a degassing conduct for food product treatment fluid, the degassing conduct having, in sequence along its development trajectory, an inclined inlet tract, within which the flow fluid rises, a degassing tract, and an outlet tract, within which the flow is directed downward; and – a degassing chamber, in correspondence of the degassing tract; the degassing tract having, at least on its upper wall, a plurality of holes suitable to communicate said degassing tract with the degassing tract to permit exit of air bubbles trapped within the flow from said degassing chamber, preventing exit of food products.

Signed and Sealed this
Thirty-first Day of October, 2017

Joseph Matal
*Performing the Functions and Duties of the
Under Secretary of Commerce for Intellectual Property and
Director of the United States Patent and Trademark Office*